(12) United States Patent
Valentin-Rumpel

(10) Patent No.: US 9,903,504 B2
(45) Date of Patent: Feb. 27, 2018

(54) COUPLING FOR A POSITIONER

(71) Applicant: SAMSON AG, Frankfurt am Main (DE)

(72) Inventor: Frank Valentin-Rumpel, Gross-Umstadt (DE)

(73) Assignee: SAMSON AG, Frankfurt am Main (DE)

( * ) Notice: Subject to any disclaimer, the term of this patent is extended or adjusted under 35 U.S.C. 154(b) by 536 days.

(21) Appl. No.: 14/329,146

(22) Filed: Jul. 11, 2014

(65) Prior Publication Data
US 2015/0016867 A1   Jan. 15, 2015

(30) Foreign Application Priority Data

Jul. 12, 2013 (DE) .................. 10 2013 107 427

(51) Int. Cl.
F16K 31/44 (2006.01)
F16K 31/04 (2006.01)
F16D 41/00 (2006.01)

(52) U.S. Cl.
CPC .............. *F16K 31/44* (2013.01); *F16D 41/00* (2013.01); *F16K 31/045* (2013.01); *F16K 31/048* (2013.01); *Y10T 403/32254* (2015.01)

(58) Field of Classification Search
CPC ...... F16K 31/53; F16K 31/535; F16K 31/563; F16K 31/566; B25B 23/141; F16D 7/10
See application file for complete search history.

(56) References Cited

U.S. PATENT DOCUMENTS

| 4,317,253 A | * | 3/1982 | Gut ................. A47L 9/0411 15/390 |
| 4,532,667 A | * | 8/1985 | Komesker ........... A47L 9/0444 15/390 |
| 5,924,536 A | * | 7/1999 | Frenken .............. F16D 43/2028 192/56.1 |

(Continued)

FOREIGN PATENT DOCUMENTS

| DE | 901122 B2 | 2/1953 |
| DE | 19519638 A1 | 5/1996 |
| DE | 102005003771 | 8/2006 |

OTHER PUBLICATIONS

German Office action dated Sep. 16, 2014, in regard to priority application serial No. DE 10 2013 107 427.8 filed Jul. 7, 2012 in the German Patent and Trademark Office comprising 7 pages.

*Primary Examiner* — Michael P Ferguson
(74) *Attorney, Agent, or Firm* — Woodling, Krost and Rust

(57) ABSTRACT

The invention relates to a coupling (10) which comprises a first component (12) and a second component (14) as well as a spring-loaded entrainer (16) which is spring-loaded and mounted on said first component (12), which second component (14) is furthermore rotatably mounted relative to said first component (12) and can be made to rotate in a first direction of rotation—the freewheeling direction (F)—and in a second direction of rotation—the blocking direction (S)—opposite to said first direction of rotation, which second component (12) furthermore comprises a guide means (18) which is designed so as to prevent a spring-loaded entrainer (16) from engaging said guide means (18) during rotation of said second component (14) in the freewheeling direction (F).

5 Claims, 3 Drawing Sheets

(56) References Cited

U.S. PATENT DOCUMENTS

Figure 3:
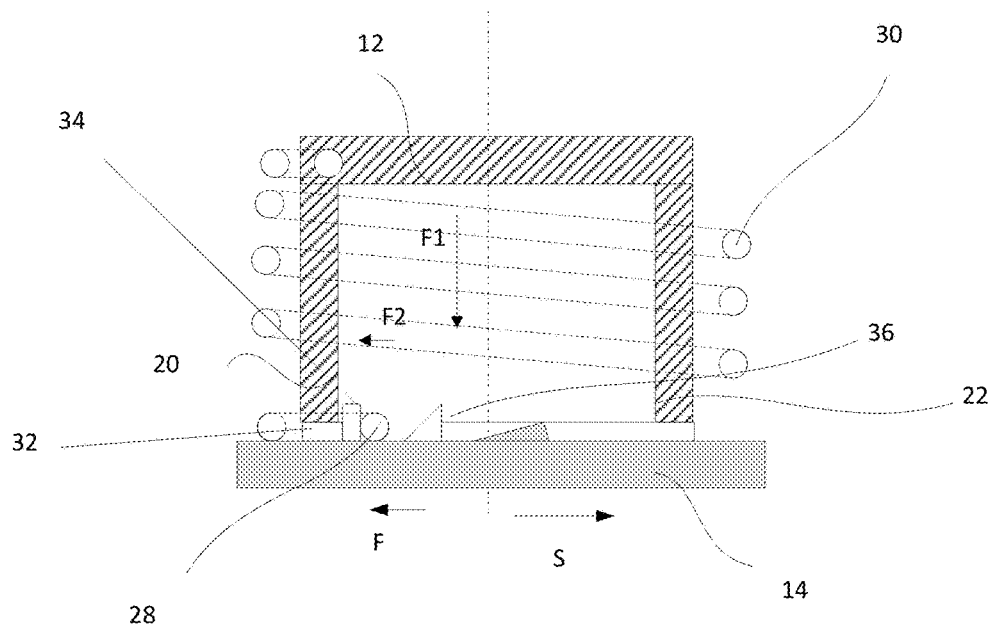
Figure 3:
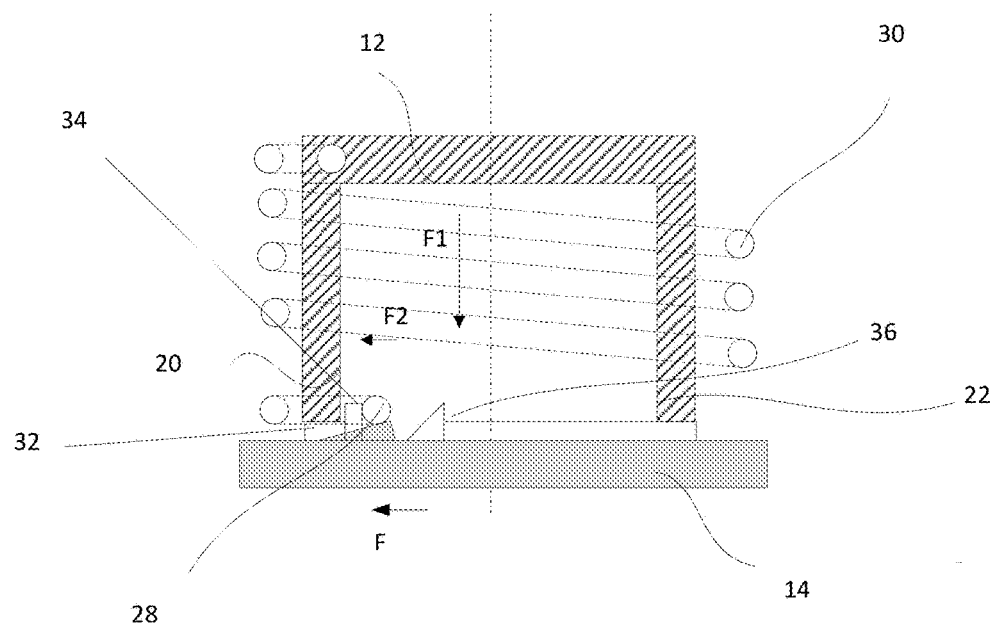
Figure 3:
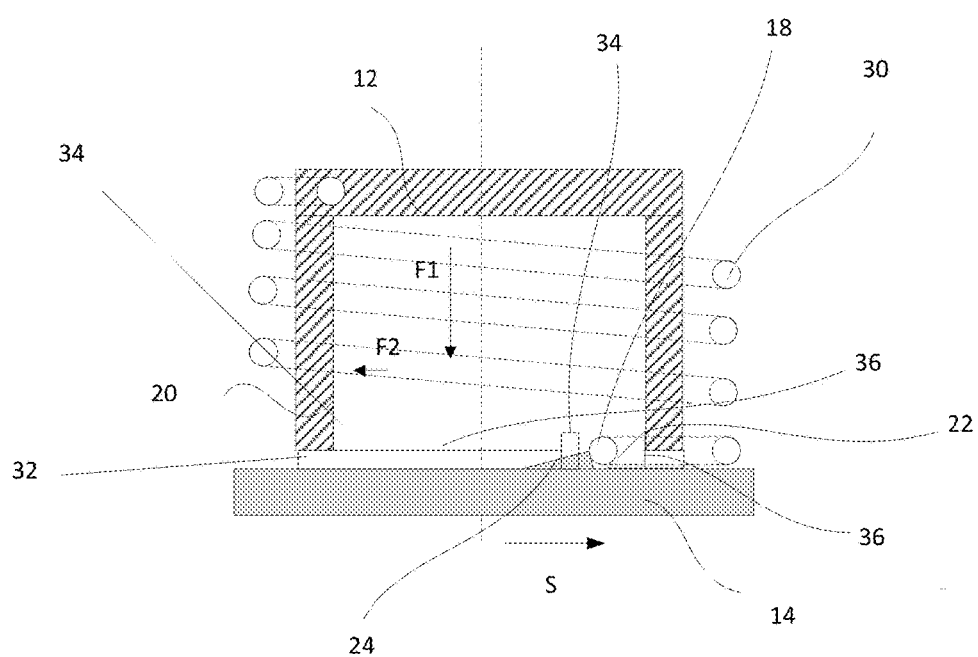

| | | | | |
|---|---|---|---|---|
| 6,666,283 B2* | 12/2003 | Frauhammer | ......... | B25B 23/141 173/93 |
| 7,155,773 B2* | 1/2007 | Haeussermann | ......... | F16D 7/10 15/390 |
| 7,611,414 B2* | 11/2009 | Mueller | .................... | F16D 7/10 464/38 |

* cited by examiner

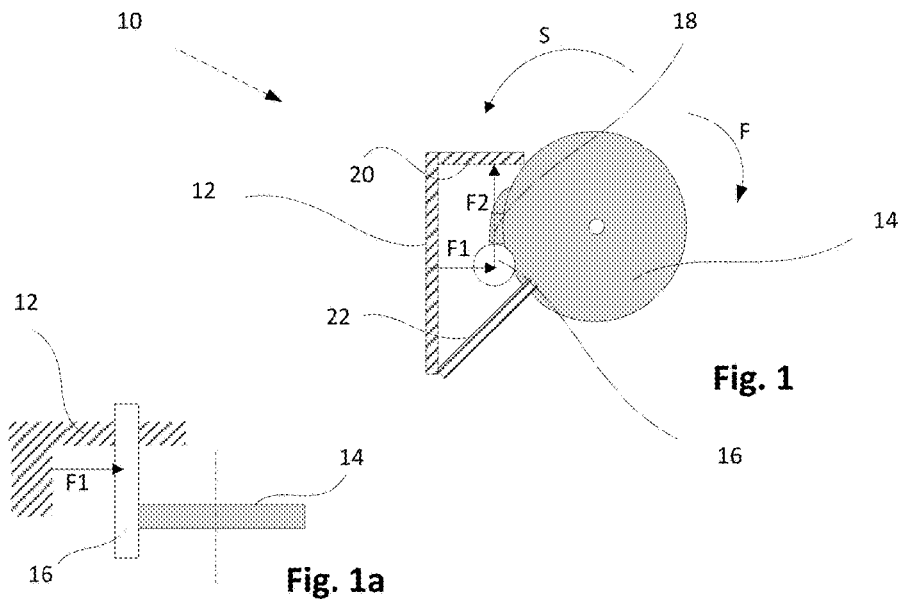
Fig. 1
Fig. 1a
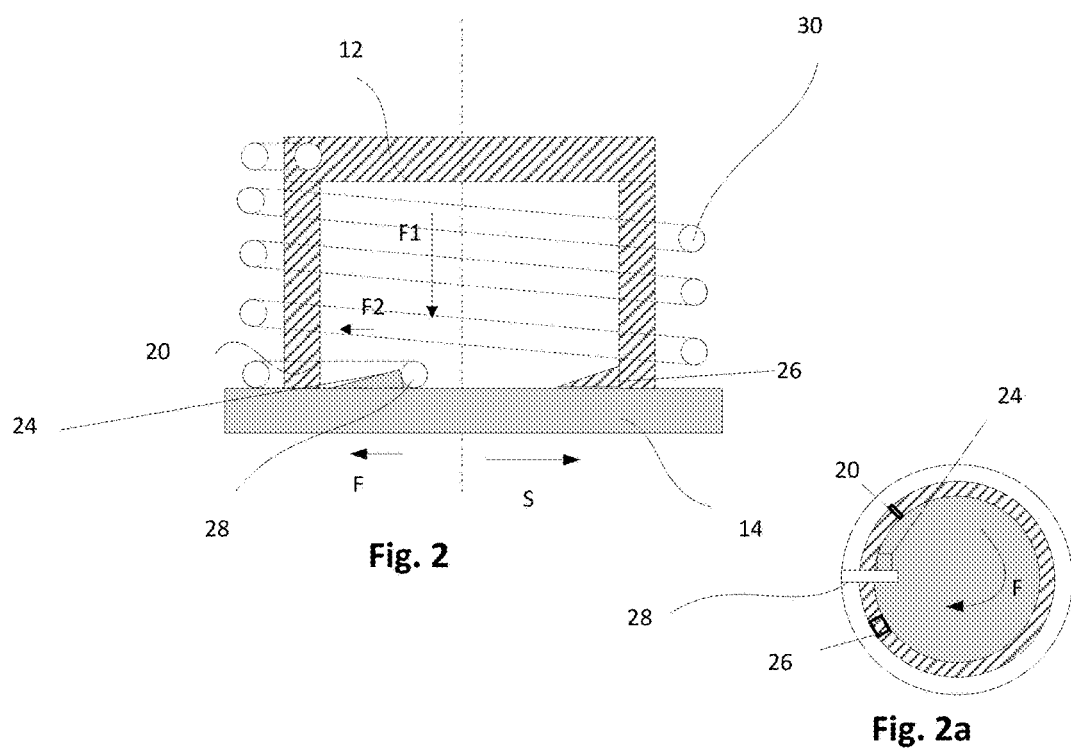
Fig. 2
Fig. 2a

COUPLING FOR A POSITIONER

This patent application claims the benefit and priority of and to German patent application no. DE No. 10 2013 107 427.8, filed Jul. 12, 2013. German patent application no. DE No. 10 2013 107 427.8, filed Jul. 12, 2013, is incorporated herein by reference hereto in its entirety.

The invention relates to a coupling for a positioner for coupling said positioner to an actuating valve.

For position control, a positioner requires the position of the actuating element of an actuating valve. For a transmission of the movement of the actuating element of said an actuating valve to the positioner, a coupling is used, in particular for a mechanical transmission of such movement.

When mounting a position sensor on an actuating valve, it is considered advantageous if the former has a mounting position. Described in German document DE 10 2005 003 771 A1 is the coupling of an actuating valve to a position detector of a positioner. This document discloses a transmission means which can be fixed in a mounting position for ease of assembly. Once the transmission means has been enabled, error-free operation can be guaranteed since sufficient room for movement will be available within the positioner after assembly.

It is the object of the invention to provide a coupling which provides an initial mounting position and is suitable both for rotary actuators and diaphragm actuators.

A coupling according to the invention for connecting an actuating valve to a positioner comprises a first component preferably connected to a positioner, a second component preferably connected to the actuating valve, e.g. via a lever, and a spring-loaded entrainer which is resiliently connected to the first component. Furthermore, the second component is mounted so as to be rotatable relative to said first component, and said second component can be rotated in a first direction of rotation—the freewheeling direction—as well as in a second direction of rotation opposite to said first direction—the blocking direction. The second component has guide means designed to prevent the spring-loaded entrainer from engaging the guide means during rotation of said second component in the freewheeling direction. Moreover, the guide means is designed so as to permit the entrainer to engage the guide means during rotation of said second component in the blocking direction. As a result, the spring-loaded entrainer will be entrained by the guide means in the blocking direction against a spring force.

The first component has a first contact surface which said spring-loaded entrainer will abut on in its initial position—during rotation of said second component in the freewheeling direction. This position will ensure easy mounting since it allows an adjusted engagement in a fixed position.

In addition, the first component has a second contact surface to which the spring-loaded entrainer will be guided by the guide means on the second component during rotation in the blocking direction. The spring-loaded entrainer will be guided on said second contact surface such that—during rotation in the blocking direction—the spring-loaded entrainer guided by the guide means of said second component will become disengaged from the guide means against the force of a spring. This provides an overload protection device which—through such disengagement—prevents damage to the element generating the spring pre-load in the direction of rotation. As the first and second contact surfaces are spaced from each other, the size of the range in which said second component can be rotated against a spring pre-load during rotation in the blocking direction can be appropriately selected.

Once the entrainer has been disengaged, the spring pre-load will cause the spring-loaded entrainer to return to its initial position on said first contact surface.

The design of the present invention provides for a coupling which has a spring pre-loaded range in a first direction of rotation thereof and includes overload protection means to prevent excess rotation in this direction, and which will kind of freewheel when rotated in the opposite direction. This defined starting point thus provides a clear mounting position.

In a particularly compact design of the coupling, the first component may be coaxially mounted with respect to the second component. In this embodiment, the spring-loaded entrainer may preferably be in the form of a free leg of a leg spring. To be more precise, this leg spring has its first end mounted on said first component whereas its second end, the free spring leg, extends away from it and thus functions as an entrainer which can be made to engage the guide means of said second component.

In the coaxial design of the two components it is considered advantageous if the second component includes a guide means in the form of a raised portion in the direction of said first component. This raised portion exhibits a shoulder in the freewheeling direction and declines sharply in the blocking direction. As a result, the free spring leg will be entrained by the raised portion during rotation of the second component in the blocking direction as the leg spring exerts a force both in the axial and in the tangential directions. In this embodiment, the first component furthermore has an overload ramp on its second contact surface which is designed such that rotation of the second component in the blocking direction will push the free leg of the spring far enough toward the first component to cause the free leg of the spring to slide over and past the raised portion. As a result, overload protection may be ensured by moving the free leg of the spring over the raised portion against its axial force.

Preferably such an overload ramp may be integrally formed with the second contact surface of the first component.

In yet another embodiment, a ring is provided coaxially between said first and second components. This ring can be rotated relative to said first and second components.

The ring has a first ring stop with a first ring contact surface in the freewheeling direction which contact surface can be made to contact the first contact surface of said first component in the freewheeling direction. The first ring stop has a second ring contact surface which abuts on the free leg of the spring when the ring stop is in its initial position. The ring stop is thus located between the first stop of said first component and the free leg of the spring. This has the advantage that the ring stop can be made of a stronger material than the first component. In particular during the adjustment to the first contact surface of said first component, the ring stop will cushion the impact of the free spring leg as it springs back in the event of an overload. This is a simple way of extending the service life of the coupling.

According to another embodiment, a ring may be provided between said first and second components and mounted so as to be coaxially rotatable relative to said first and second components. Said ring has a second ring stop which rises in the blocking direction so as to form the overload ramp and extends further to form a ring contact surface which can be made to contact the second contact surface of said first component. In this way, the free spring leg can be guided on the ring, with the ring being entrained in the blocking direction for so long until the ring contact surface makes contact with the second contact surface of said first component. Further rotation of the second component will then urge the free spring leg onto the overload ramp of the ring, thus causing the free spring leg to become disengaged from the raised portion of said second component.

In a particularly advantageous embodiment of a coupling, a ring is coaxially mounted between the first and second components which ring is rotatably guided with respect to said first and second components. The ring may be provided with a first ring stop which has a first ring contact surface in the freewheeling direction that can be made to contact the first contact surface of the first component in the freewheeling direction.

In an initial position of the first ring stop, it is situated between the free spring leg and the first contact surface of the first component. The ring moreover includes a second ring stop which is spaced from said first ring stop in the blocking direction, and which second ring stop rises in the blocking direction to form the overload ramp, and further extends to form a second ring contact surface which can be made to contact said second contact surface of said first component. This allows a combination of the advantages of a first ring stop for cushioning the rebound of the free spring leg and the overload ramp which rotates with the component.

Preferably, the leg spring may be positioned so as to have its axis extending coaxially to the first and second components. This will yield a particularly compact design of the coupling.

According to another improvement, part of the first component may be cylindrical in shape, with the cylindrical portion extending through the core of the leg spring. This will provide support for the leg spring.

In yet another embodiment, the raised portion of the second component may extend radially on the inside with regard to the contact surfaces of the first component. The leg spring will thus be capable of embracing the first component, with the free spring leg acting as an entrainer facing inward and thus being adapted to be entrained by the raised portion against the force of the leg spring during rotation in the blocking direction. This allows a simple implementation of the coupling according to the invention.

The invention furthermore relates to a positioner which comprises a coupling of the above mentioned type which can be used to connect the positioner to an actuating valve. Through the integration of the coupling according to the invention in the positioner a universal positioner can be provided which is suitable both for controlling actuating valves comprising rotary and linear actuators as typically used especially in diaphragm actuators.

Further advantages, features and potential applications of the present invention may be gathered from the description which follows, in conjunction with the embodiments illustrated in the drawings.

Throughout the description, the claims and the drawings, those terms and associated reference signs will be used as are notable from the enclosed list of reference signs. In the drawings is shown FIG. 1 a schematic view of a coupling for connecting an actuating valve;

FIG. 1a a schematic front view of a coupling;

FIG. 2 another embodiment of a coupling according to the invention;

FIG. 2a a schematic top view of the coupling of FIG. 2;

FIG. 3a a schematic view of a coupling element;

FIG. 3b another schematic view of a coupling element, and

FIG. 3c yet another schematic view of a coupling element.

FIG. 1 shows a schematic view of a coupling for connecting an actuating valve to a positioner.

Coupling 10 comprises a first component 12, e.g. in engagement with the positioner housing, and a second component 14 which latter can be rotated relative to said first component 12, e.g. in engagement with a lever that transmits movement of an actuating element. Furthermore, an entrainer 16 is provided which is spring-loaded and mounted opposite said first component 12. The action of the spring load F1, F2 is indicated by arrows.

Furthermore, the first component 12 has a first contact surface 20 and a second contact surface 22. The spring forces F1, F2 have been chosen such that during rotation of said second component 14 in the freewheeling direction F the spring-loaded entrainer 16 will abut on the first contact surface 20. The second component 14 has a guide means 18 which—during rotation in the blocking direction S—will tangentially entrain the entrainer 16 against the spring force F2. In this area, the pre-load of the spring F2 will act on the component 14. This means the area from the first contact surface 20 to the second contact surface 22. On the second contact surface 22—due to the rotation in the blocking direction S—the entrainer 16 will be deflected such that it no longer engages the guide means 18. This will cause the spring-loaded entrainer 16—after deflection by to the second contact surface 22—to move past the guide means 18 and back to the first contact surface 20. This in turn is the initial position.

In order to ensure engagement during rotation, a spring force F1 will radially act on the spring-loaded entrainer 16, against which force the spring-loaded entrainer 16 will be displaced on the second contact surface 22.

This thus provides a coupling for connecting an actuating valve to a positioner which allows a motion behaviour of a rotation in the freewheeling direction F at an unlimited rotary angle, and on the other hand, during rotation in the blocking direction S, will provide a spring pre-loaded range. Moreover, this coupling still guarantees overload protection during rotation in the blocking direction S.

FIG. 1a is a schematic front view of the coupling 10 of FIG. 1, in which the second component 14 is shown as entraining the spring-loaded entrainer 16 against the spring force F2, with the spring force F1 also acting on said first component 12 and keeping the spring-loaded entrainer 16 in engagement with the second component 14.

FIG. 2 is yet another embodiment of a coupling according to the invention for connecting an actuating valve to the second component 14. In the embodiment of FIG. 2 the coupling comprises a cylindrical first component 12 on which a spring leg 30 is mounted. Opposite said first component 12 a second component 14 is coaxially and rotatably mounted. The second component 14 can be rotated relative to said first component 12 in a freewheeling direction F and in a blocking direction S. Said first component 12 has a first contact surface 20 at a left end thereof. This contact surface 20, which is also shown in FIG. 2a, in an initial position forms the stop for the free leg 28 of the leg spring 30. FIG. 2 and FIG. 2a are views of a situation in which the second component 14 is rotated in the blocking direction S relative to the first component 12. During such rotation, the free leg 28 of the leg spring 30 is entrained by a guide means 24 located on the second component 14, against the spring force F2. The spring force F1 which acts in an axial direction ensures that the free spring leg 28 remains in engagement with the guide element 24. In the blocking direction S, the second component 14 can be moved against the spring force F until the free spring leg 28 makes contact with the second contact surface 26 of the first component 12. If the second component 14 is rotated further relative to the first component 12 in the blocking direction S, the free spring leg 28 will be pushed onto the overload ramp 26 of the first component 12 against the spring force F1. As a result, the guide element 24 will slide underneath and past the free spring leg 28, after which the pre-load force F2 will urge the free spring leg 28 into contact with the first contact surface 24 again.

As can clearly be seen in the view of FIG. 2a, the overload protection feature can easily be implemented owing to the radial inner position of the guide element 24 with respect to the overload ramp 26.

FIGS. 3a to 3c are schematic views of a coupling element showing different states of rotation thereof. The coupling element 10 comprises a first component 12, a second component 14 which can be rotated relative thereto as well as a ring 32 which is likewise coaxially mounted with respect to said first and second components 12, 14.

Similar to what has been described with respect to FIG. 2, the second component 14 of FIG. 3a also includes a guide element 24. Said guide element 24 is adapted to entrain the free spring leg 28 during rotation in the blocking direction S. The contact surfaces 20, 22 of the first component 12 are designed so as to form a stop for the first ring stop 34 and the second ring stop 36. Between the first ring stop 34 and the second ring stop 36, the ring 32 is open, thus allowing the free spring leg 28 to protrude the ring perimeter and thus to engage the radial inner guide element 24 (similar as in FIG. 2a).

The view of FIG. 3b shows a further rotation of the second component 14 in the freewheeling direction F relative to the first component 12. Since the first ring stop 34 is situated between the first contact surface 20 of said first component 12 and the free spring leg 28, the rotatable ring 32—in an initial position thereof—will be urged against the first contact surface 20 of the first component 12. If the second component 14 is rotated in the freewheeling direction F, the free spring leg 28 will remain in this position in the horizontal direction. In the freewheeling direction F, the guide element 24 is designed such that it will not block rotation in this direction but its ramp-like design will allow the free spring leg 28 to be displaced in an axial direction against the spring force F2. This will allow a largely free rotation of the second component 14 in the freewheeling direction.

FIG. 3c is a view of the state obtained when the second component 14 is rotated in the blocking direction S relative to said first component 12. As described above, when the second component 14 is rotated, the free spring leg 28 will be entrained by the entrainer 24 against the spring force F2. In this case, the rotatable ring 32 will also be entrained in the blocking direction S. The ring will thus rotate on until the second ring stop 36 has made contact with the second contact surface 22 of the first component 12. If the second component 14 is rotated further relative to the first component 12 and thus also relative the stationary ring 32, the free spring leg 28 will be pushed by the guide element 24 against the spring force F1 onto the ramp of the second ring stop until the free spring leg 28 slides over and past the guide element 24 and presses against the first ring stop 34. The spring force F2 causes the ring stop 34 to be returned to its initial position on the first contact surface 20 of the first component 12 by the free spring leg 28 during the ring 32. This would correspond to an initial position as shown in FIG. 3a.

This thus provides a multi-functional spring connection with overload protection feature and freewheeling function which allows the connection of actuating valves having various actuators in a universal manner.

LIST OF REFERENCE NUMERALS 10 coupling
12 component
14 component
16 spring-loaded entrainer
18 guide means
20 contact surface
22 contact surface
24 raised portion
26 overload ramp
28 free spring leg
30 leg spring
32 ring
34 ring stop
36 ring stop
F freewheeling direction
S blocking direction

The invention claimed is:

1. A coupling (10), comprising:
a first component (12) and a second component (14);
a spring-loaded entrainer (16) mounted on said first component (12);
said second component (14) being mounted so as to be rotatable relative to said first component (12);
said second component (14) being rotated in a first direction of rotation, a freewheeling direction (F), and in a second direction of rotation, a blocking direction (S) opposite to said first direction;
said second component including a guide means (24) which ensures that said spring-loaded entrainer (16) will not engage said guide means (24) during rotation of said second component (14) in said freewheeling direction (F), and to ensure that said spring-loaded entrainer (16) will engage said guide means (24) during rotation of said second component (14) in said blocking direction (S), resulting in said spring-loaded entrainer (16) being entrained by said guide means (24) in said blocking direction (S) against the force of a spring;
said spring-loaded entrainer (16) comprising a free spring leg (28) of a leg spring (30), said first component (12) being coaxially mounted relative to said second component (14), said leg spring (30) having a first end thereof attached to said first component (12), and said free leg (28) of said leg spring (30) being urged into engagement with said guide means (24) of said second component (14);
said first component (12) including a first contact surface (20) on which said spring-loaded entrainer (16) abuts in an initial position during rotation of said second component (14) in said freewheeling direction (F);
said first component (12) having a second contact surface (22) on which said spring-loaded entrainer (16) is guided by said guide means (24) during rotation in said blocking direction (S) of said second component (14), said spring-loaded entrainer (16) being guided on said second contact surface (22) such that during rotation in said blocking direction (S) said spring-loaded entrainer (16) guided by said guide means (24) of said second component (14) will become disengaged from said guide means (24) against a spring force, after which said spring-loaded entrainer (16) will return to said initial position on said first contact surface (20);

said guide means being in the form of a raised portion (24) in the direction of said first component (12), said raised portion (24) having a shoulder in said freewheeling direction (F) and declining sharply in said blocking direction (S), said free spring leg (28) being entrained by said raised portion (24) during rotation of said second component (14) in said blocking direction (S), and said first component (12) including an overload ramp (26) on said second contact surface (22), said overload ramp (26) during rotation of said second component (14) in said blocking direction (S), urging and pushing said free spring leg (28) toward said first component (12) until said free spring leg (28) slides across and past said raised portion (24) of said second component.

2. The coupling of claim 1 characterized in that said overload ramp (26) is designed so as to form an integral unit with said second contact surface (22) of said first component (12).

3. A coupling (10), comprising:

a first component (12) and a second component (14);

a spring-loaded entrainer (16) mounted on said first component (12);

said second component (14) being mounted so as to be rotatable relative to said first component (12);

said second component (14) being rotated in a first direction of rotation, a freewheeling direction (F), and in a second direction of rotation, a blocking direction (S) opposite to said first direction;

said second component including a guide means (24) which ensures that said spring-loaded entrainer (16) will not engage said guide means (24) during rotation of said second component (14) in said freewheeling direction (F), and to ensure that said spring-loaded entrainer (16) will engage said guide means (24) during rotation of said second component (14) in said blocking direction (S), resulting in said spring-loaded entrainer (16) being entrained by said guide means (24) in said blocking direction (S) against the force of a spring;

said spring-loaded entrainer (16) comprising a free spring leg (28) of a leg spring (30), said first component (12) being coaxially mounted relative to said second component (14), said leg spring (30) having a first end thereof attached to said first component (12), and said free leg (28) of said leg spring (30) being urged into engagement with said guide means (24) of said second component (14);

said first component (12) including a first contact surface (20) on which said spring-loaded entrainer (16) abuts in an initial position during rotation of said second component (14) in said freewheeling direction (F);

said first component (12) having a second contact surface (22) on which said spring-loaded entrainer (16) is guided by said guide means (24) during rotation in said blocking direction (S) of said second component (14), said spring-loaded entrainer (16) being guided on said second contact surface (22) such that during rotation in said blocking direction (S) said spring-loaded entrainer (16) guided by said guide means (24) of said second component (14) will become disengaged from said guide means (24) against a spring force, after which said spring-loaded entrainer (16) will return to said initial position on said first contact surface (20);

said guide means being in the form of a raised portion (24) in the direction of said first component (12), said raised portion (24) having a shoulder in said freewheeling direction (F) and declining sharply in said blocking direction (S), said free spring leg (28) being entrained by said raised portion (24) during rotation of said second component (14) in said blocking direction (S), and said first component (12) including an overload ramp (26) on said second contact surface (22), said overload ramp (26) during rotation of said second component (14) in said blocking direction (S), urging and pushing said free spring leg (28) toward said first component (12) until said free spring leg (28) slides across and past said raised portion (24) of said second component;

said leg spring including an axis, and said axis of said leg spring extends coaxially with respect to said first and second components.

4. The coupling of claim 3 characterized in that part of said first component (12) is cylindrically shaped, said cylindrical shaped part extending through a core of said leg spring (30).

5. The coupling of claim 4 characterized in that said raised portion (24) of said second component (14) extends radially on the inside with respect to said contact surfaces (20, 22) of said first component (12).

\* \* \* \* \*